(12) United States Patent
Mostatab

(10) Patent No.: US 12,453,525 B2
(45) Date of Patent: Oct. 28, 2025

(54) DENTAL IMAGING DEVICES AND SYSTEMS

(71) Applicant: Rebecca Mostatab, King of Prussia, PA (US)

(72) Inventor: Rebecca Mostatab, King of Prussia, PA (US)

( * ) Notice: Subject to any disclaimer, the term of this patent is extended or adjusted under 35 U.S.C. 154(b) by 163 days.

(21) Appl. No.: 18/516,004

(22) Filed: Nov. 21, 2023

(65) Prior Publication Data

US 2025/0160780 A1    May 22, 2025

(51) Int. Cl.
 *A61B 6/51* (2024.01)
 *A61C 9/00* (2006.01)

(52) U.S. Cl.
 CPC ............ *A61B 6/512* (2024.01); *A61C 9/0053* (2013.01)

(58) Field of Classification Search
 CPC ............................. A61C 9/0053; A61B 6/512
 See application file for complete search history.

(56) References Cited

U.S. PATENT DOCUMENTS

| | | | |
|---|---|---|---|
| 10,810,787 B2 * | 10/2020 | Myyrylainen | A61B 6/5247 |
| 11,382,727 B1 * | 7/2022 | Marghalani | A61C 9/0006 |
| 2018/0140394 A1 * | 5/2018 | Atiya | A61B 1/0625 |
| 2018/0153485 A1 * | 6/2018 | Rahmes | A61B 6/587 |
| 2022/0142749 A1 | 5/2022 | Faranjani et al. | |

FOREIGN PATENT DOCUMENTS

KR    20150021310 A    3/2015

* cited by examiner

*Primary Examiner* — Casey Bryant

(74) *Attorney, Agent, or Firm* — Kintner IP, LLC; Mary Frances Ludwig

(57) ABSTRACT

A dental imaging systems provides multiple dental imaging functions, including digital x-ray, 3D dental scanning, and intraoral imaging. The system includes imaging trays that can be inserted into the mouth and positioned around the teeth. Each imaging tray has exterior and interior sidewalls connected by a floor. One or more imaging sensors are mounted on the sidewalls and can sense x-ray radiation, visible light, ultraviolet light, and infrared light. The imaging trays are designed to interface with an umbilical, which contains cables for transmitting power, data, and light. A workstation communicates with the imaging trays via the umbilical. The dental imaging system is capable of performing digital x-ray imaging, 3D dental scanning, and intraoral imaging, providing improved speed and patient comfort.

14 Claims, 3 Drawing Sheets

DENTAL IMAGING DEVICES AND SYSTEMS

TECHNICAL FIELD

The present invention pertains generally to dentistry, and more particularly to devices and systems for dental imaging.

BACKGROUND

Obtaining dental images, such as radiographs, 3D scans, or intraoral images can be time consuming, especially so if the dental professional desires to obtain more than one type of image. Intraoral imaging devices are often large and cause discomfort to a patient. This discomfort is increased when the imaging session takes a long time. This causes staff and patient frustrations, as well as increased chair time that causes delays-costing the patient and practices lost productivity.

There is a need in the art for dental imaging devices and systems which reduce the amount of time required to obtain images, and which can increase patient comfort. Improved comfort and efficiency would improve the patient experience, as well as enhance profitability.

BRIEF SUMMARY OF THE INVENTION

Embodiments disclosed herein are directed to dental imaging devices and systems used for multiple dental imaging techniques, including without limitation: intraoral radiography (also referred to herein as digital x-rays), intraoral scanning (also referred to herein as 3D dental scans or 3D scans), and/or intraoral imaging.

According to one or more embodiments, a dental imaging system for use in imaging teeth in a mouth of a patient includes: one or more imaging trays shaped and configured for insertion into the mouth of the patient and positionable to substantially surround one or more teeth, each of the one or more imaging trays having an exterior sidewall and an interior sidewall connected to the exterior sidewall by a floor; one or more imaging sensors mounted on at least one of the exterior sidewall and the interior sidewall, each of the one or more imaging sensors configured to sense at least one of x-ray radiation, visible light, ultraviolet light, and infrared light; each of the one or more imaging trays structurally configured to interface with an umbilical; one or more cables within the umbilical, each of the one or more cables configured to transmit at least one of power, data, and light; a workstation configured for communication with the one or more imaging trays via the umbilical; and wherein the dental imaging system is configured to perform one or more of digital x-ray imaging, 3D dental scanning, and intraoral imaging.

According to one or more embodiments of the dental imaging system, each of the one or more imaging trays including a first sensor configured to sense visible light and a second sensor configured to sense x-ray radiation.

According to one or more embodiments of the dental imaging system, each of the one or more imaging trays includes a light source.

According to one or more embodiments of the dental imaging system, each of the one or more imaging trays includes one or more apertures in the floor, and each of the one or more apertures sized and located to permit insertion of a cooperating endodontic file therethrough.

According to one or more embodiments of the dental imaging system, each of the one or more imaging sensors is flexible.

According to one or more embodiments of the dental imaging system, each of the one or more imaging sensors is optically coupled to one or more of a lens and an optical filter.

According to one or more embodiments, the dental imaging system further includes one or more sets of imaging trays, wherein each set of imaging trays is collectively configured to image all of the teeth of the patient.

According to one or more embodiments, the dental imaging system further includes: a first set of imaging trays, each tray of the first set of imaging trays including one or more imaging sensors configured to sense x-ray radiation; a second set of imaging trays, each tray of the second set of imaging trays including one or more imaging sensors configured to sense visible light; and a third set of imaging trays, each tray of the third set of imaging trays including a light source.

According to one or more embodiments of the dental imaging system, the one or more cables within the umbilical include a power transmission cable, a data transmission cable, and a fiber-optic cable.

According to one or more embodiments of the dental imaging system, the workstation includes an x-ray radiation source.

According to one or more embodiments of a dental imaging tray for use in imaging teeth in a mouth of a patient, the dental imaging tray cooperating with an umbilical connected to a workstation, the dental imaging tray includes: an exterior sidewall and an interior sidewall connected to the exterior sidewall by a floor; one or more imaging sensors mounted on at least one of the exterior sidewall and the interior sidewall, each of the one or more imaging sensors configured to sense at least one of x-ray radiation, visible light, ultraviolet light, and infrared light; a proximal end structurally configured to interface with an umbilical to receive at least one of power, data, and light; and wherein the dental imaging tray is shaped and configured for insertion into the mouth of the patient and positionable to substantially surround one or more teeth.

According to one or more embodiments of a dental imaging tray, one or more of the exterior sidewall and the interior sidewall are shaped to extend beyond the gum line for imaging the root of a tooth, the root located below the gum line, when the dental imaging tray is positioned in the mouth of the patient.

According to one or more embodiments of a dental imaging tray, the interior sidewall has an adjoining roof.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the dental imaging devices and systems are described with reference to the following figures, wherein like reference numerals refer to like parts throughout the various views unless otherwise specified.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

DETAILED DESCRIPTION OF THE INVENTION

The detailed description describes non-limiting exemplary embodiments. Any individual features may be combined with other features as required by different applications for at least the benefits described herein. As used herein, the term "about" means plus or minus 10% of a given value unless specifically indicated otherwise. As used herein, the terms "substantially" or "substantially the same" mean that two items are at least 90% the same; for example, elements described as "substantially parallel" may be parallel to within 90%, an element described as "substantially circular" may be circular to within 90%, and so on.

As used herein, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

Figure 1:
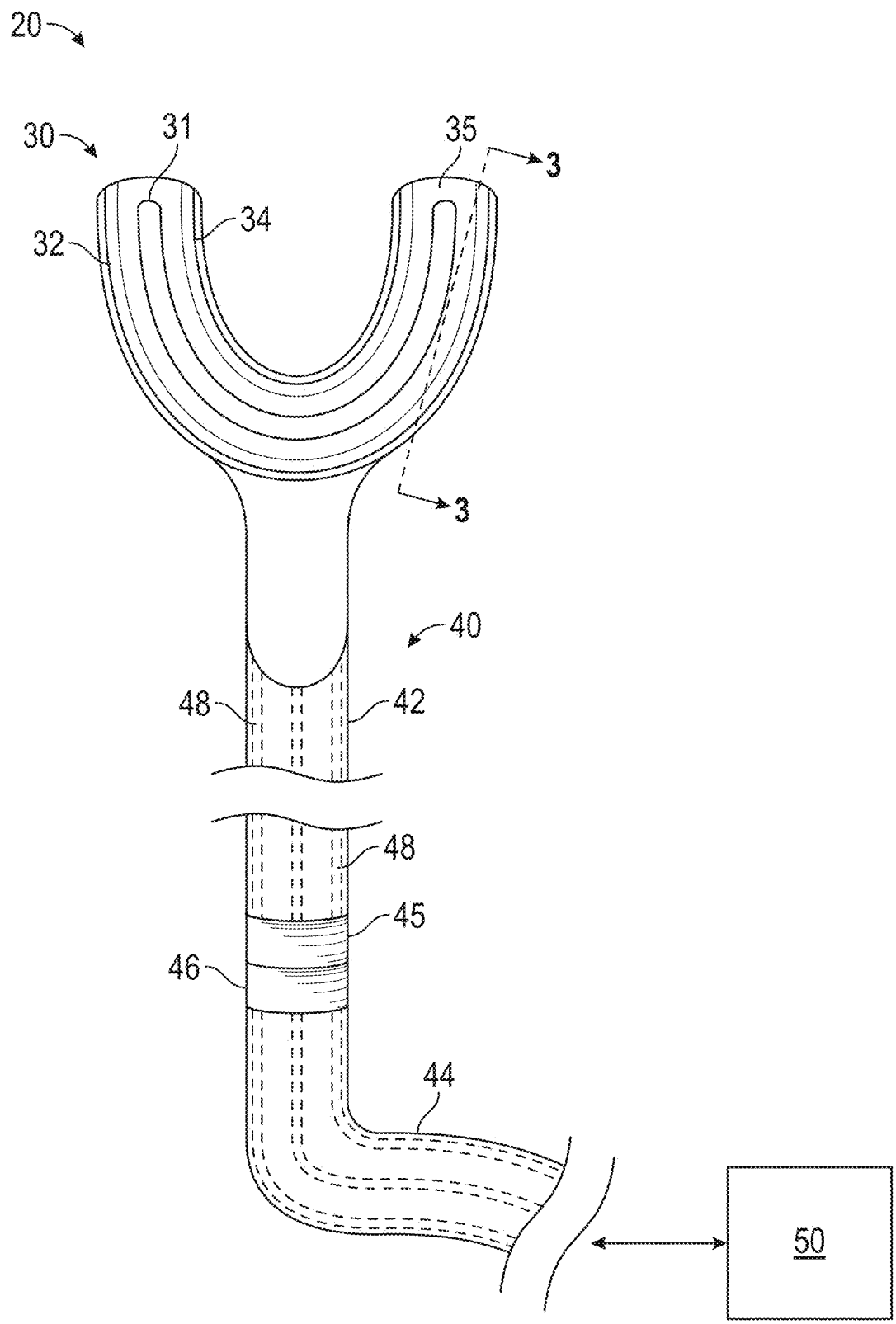
FIG. 1 is a schematic diagram of an embodiment of a dental imaging system.

FIG. 1 shows a schematic diagram of a dental imaging system generally designated as system 20. The system includes one or more imaging trays 30 shaped and configured for insertion into the mouth of a patient and positionable to substantially surround one or more of the patient's teeth. Imaging tray 30 is connected to one or more cables 48, where the one or more cables are collectively referred to herein as an umbilical 40. The cables of umbilical 40 are configured to transfer power, data, and/or light between imaging tray 30 and a workstation 50.

Imaging trays 30 of the embodiments described herein are each suitable for performing one or more of the following imaging functions: digital x-ray, 3D dental scanning, and intraoral imaging. In one embodiment, an imaging tray 30 is configured to perform all three of the above imaging functions. In another embodiment, a system 20 includes multiple imaging trays 30 each configured to perform one or more of the above imaging functions.

Figure 2:
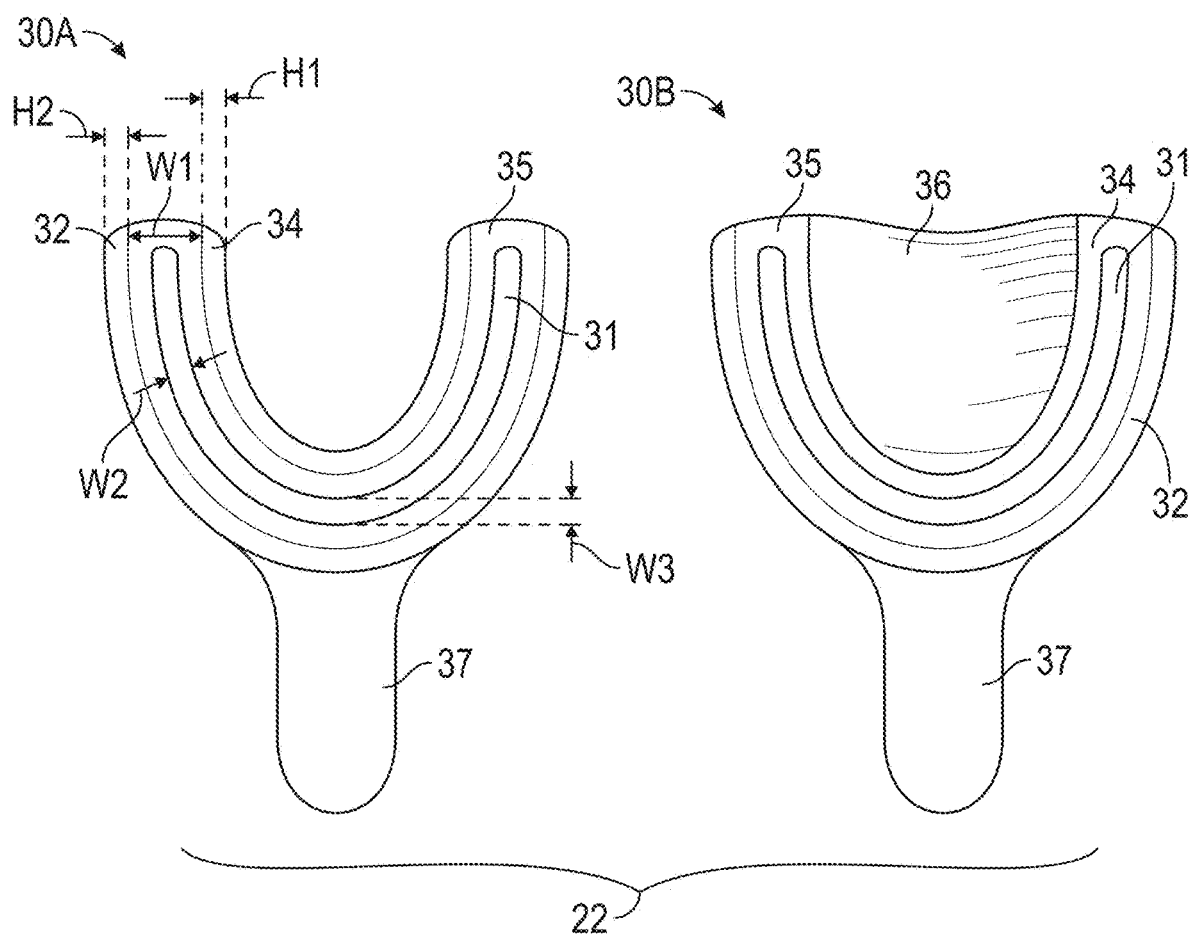
FIG. 2 is a schematic diagram of a set of imaging trays of an embodiment of the dental imaging system.

System 20 may include one or more sets 22 of imaging trays 30, as shown in FIG. 2. Each set 22 may include one or more imaging trays 30, and the trays of a set may be collectively configured to image all of the teeth of a patient. For example, a lower imaging tray 30A together with an upper imaging tray 30B may comprise a first set 22 of imaging trays, where lower imaging tray 30A may be configured to image all teeth of a patient's lower jaw and upper imaging tray 30B may be configured to image all teeth of a patient's upper jaw. In other embodiments, set 22 may include three, four, five, six or another number of imaging trays. Each imaging tray may be shaped and configured to substantially surround some or all of the upper teeth, the lower teeth, the anterior teeth, the upper anterior teeth, the lower anterior teeth, the right or left upper posterior teeth, the right or left lower posterior teeth, or combinations thereof. The tooth coverage provided by any imaging tray may, for example, be similar to that provided by a quadrant tray, a triple tray, or a sextant tray, as known in dentistry for other purposes (such as taking impressions for crowns or the like). Any of the imaging trays may be provided in multiple sizes, for example, small, medium, and large, to accommodate different sizes of a patient's mouth.

Each imaging tray 30 may have an exterior sidewall 32 (configured to be positioned on the cheek side of the patient's jaw) and an interior sidewall 34 (configured to be positioned on the tongue side of the patient's jaw). One or both of the exterior sidewall 32 and interior sidewall 34 may be shaped to extend beyond the gum line in the direction of the jaw bone. For example, on imaging tray 30A both exterior sidewall 32 and interior sidewall 34 may be shaped to extend beyond the gum line in the direction of the jaw bone; this embodiment may be suitable for a lower jaw. On imaging tray 30B, exterior sidewall 32 may be shaped to extend beyond the gum line in the direction of the jaw bone while interior sidewall 34 does not; this embodiment may be suitable for an upper jaw. In embodiments, either or both of the exterior sidewall 32 and interior sidewall 34 may be shaped to extend beyond the gum line by at least 10 mm, between about 10 mm and about 15 mm, or between about 25 mm and about 30 mm. This feature allows imaging of the roots of the teeth, for diagnostic purposes. In the embodiment of FIG. 2, exterior sidewall 32 may have a height H2 of between about 10 mm and about 15 mm. Interior sidewall 34 may have a height H1 of between about 25 mm and about 30 mm.

Figure 4:
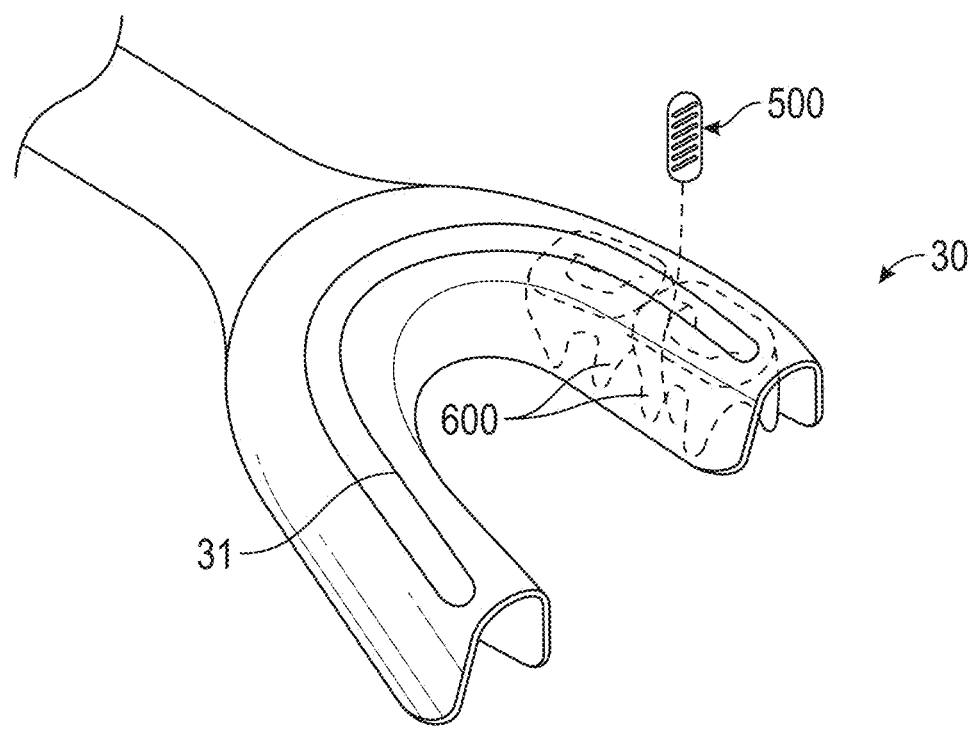
FIG. 4 is an upper perspective view of an embodiment of an imaging tray.

Exterior sidewall 32 and interior sidewall 34 may be connected by a floor 35. Floor 35 is configured to be positioned along the biting surface of the teeth. The imaging trays may also include one or more apertures 31 in the floor 35. As shown in FIG. 4, aperture 31 may be sized and located to permit insertion of an endodontic file 500 suitable for measuring the length of a tooth root 600. Referring again to FIG. 2, floor 35 has a width W1. Width W1 may be, for example, about 10 mm. Aperture 31 may be configured as a slot within floor 35. One or more apertures may be sized and located to permit insertion of an endodontic file suitable to measure the tooth root length of all teeth surrounded by the imaging tray. Aperture 31 may have a width of between about 3 mm and about 4 mm. In the shown embodiment, aperture 31 has a width W2 of about 4 mm in the area of the molars and pre-molars, and transitions to a width W3 of about 3 mm in the area of the incisors.

In some embodiments, such as the upper imaging tray 30B of FIG. 2, the interior sidewall 34 may have an adjoining roof 36. Roof 36 may be shaped complementary to the roof of the mouth. A tray including a roof 36 may be particularly beneficial when imaging to fit a patient for dentures. In other embodiments, the lower imaging tray 30A may be shaped for use in imaging teeth of either the upper or lower jaw (for example, the tray may be inverted between upper and lower positions).

Figure 3:
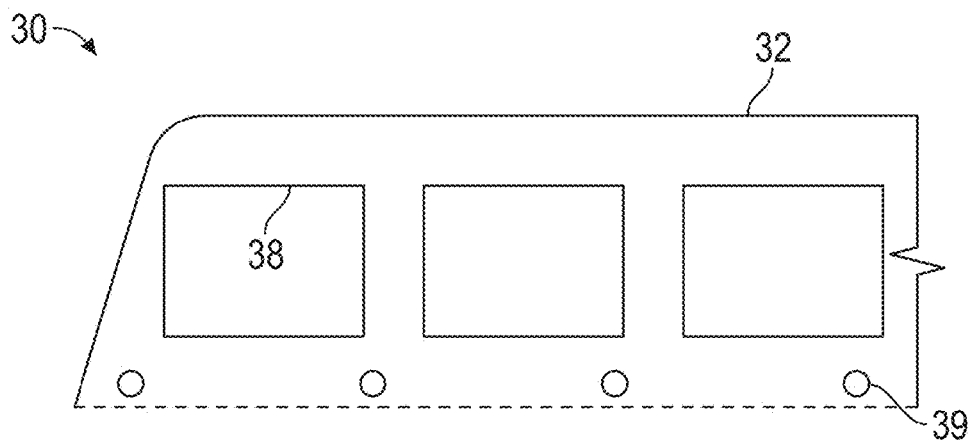
FIG. 3 is an enlarged cross-sectional view along line III-III of FIG. 1.

FIG. 3 is an enlarged cross-sectional view of imaging tray 30 taken along line III-III of FIG. 1. The exterior sidewall 32 is shown in this view, however the configuration discussed here may be applied, mutatis mutandis, to the interior sidewall 34 or to the floor 35 of the imaging tray. One or more imaging sensors 38 are mounted along exterior sidewall 32, and positioned to image the patient's teeth. Exemplary types of sensor 38 include, but are not limited to, charge coupled device (CCD) sensor chips; complementary metal oxide sensor (CMOS) chips; and digital phosphor storage plate (PSP) sensors. Sensors 38 may be configured to sense different electromagnetic radiation bands, (such as x-ray radiation, visible light, ultraviolet (UV) light, or infrared light), depending on the desired application. Sensors 38 may be larger or smaller, relative to sidewall 32, than the sensors shown in FIG. 3. Sensors 38 may be flexible for ease of positioning the imaging tray and improved patient comfort. The use of many small sensors may improve the overall flexibility of the imaging tray, compared to using fewer large sensors. The sensors may be optically coupled to one or more lenses, optical filters, or other optical elements, as may be desired for the one or more imaging applications.

In some embodiments, imaging tray 30 may include one or more light sources 39 suitable for providing illumination as may be required by the imaging sensors. Light sources 39 may include, for example, light-emitting diodes, fiber-optics, and the like, and may provide illumination having different electromagnetic spectra for different applications (for example, visible light, UV light, infrared light, narrow spectral bands, etc.). Light sources 39 may be optically coupled to one or more lenses, mirrors, optical filters, polarizing optics, or other optical elements as may be desired for the specific imaging application(s).

Referring again to FIG. 1, umbilical 40 may include a proximal portion 42 connectable to a distal portion 44. Proximal portion 42 may be connected to imaging tray 30 with either a permanent or a removable connector. Proximal portion 42 may be rigid, semi-rigid, or flexible. Distal portion 44 may be removably connectable to proximal portion 42. For example, each of the proximal portion 42 and the distal portion 44 may include complementary elements 45, 46 of a twist-lock, clamping, or other type of connector. In other embodiments, umbilical 40 may be a single component which connects an imaging tray 30 to a workstation 50. Distal portion 44 may be longer than proximal portion 42, and is preferably flexible.

Umbilical 40 may include one or more cables 48 (shown in dashed lines) for transferring power, data, and/or light between imaging tray 30 and workstation 50. For example, a cable 48 may be a power transmission cable; a data transmission cable, such as a USB or ethernet cable; or a fiber-optic cable. One or more cables 48 may be bundled together and enclosed within a sheathing to form the umbilical 40. Umbilical 40 may include some cables for use with specific imaging trays of the system, and which may not be used with other imaging trays of the system. In this case, one or more different arrangements of proximal end 45 may be configured to interface with a specific distal end 46. In other words, a specific proximal end may not connect to all cables provided within a specific distal end of the umbilical.

In addition, or instead, sensors 38 may be configured to wirelessly communicate data to the workstation. Tray 30 may include a battery to power components of the tray. Proximal end 45 of tray 30 may be a handle 37 (see FIG. 2), and may or may not be configured to connect to external cabling or other devices (such as, for example, a battery charging unit).

The workstation 50 may be portable (e.g., a small cart) or stationary (e.g., a desktop, benchtop, floor-standing, or wall-mounted unit). Workstation 50 may include devices for interface with the dental imaging system 20, such as a computer, for data processing, transfer, or storage; a display, for viewing captured images, either before or after processing; a power supply or interface to a power source, such as a battery, battery charger, or an interface to the building electrical supply; a radiation source for x-ray exposure; or a light source. The elements of workstation 50 may cooperate with one another, or not, and may be physically located together, or not, depending upon the facility and use application. Some elements of the workstation may be remotely located, for example, the computer may be connected via a local network or a remote network (e.g., a cloud computer). Any or all of the elements of the workstation may be supplied independently, for cooperation with system 20. In other embodiments, one or more elements of the workstation may be packaged with system 20.

Figure 5:
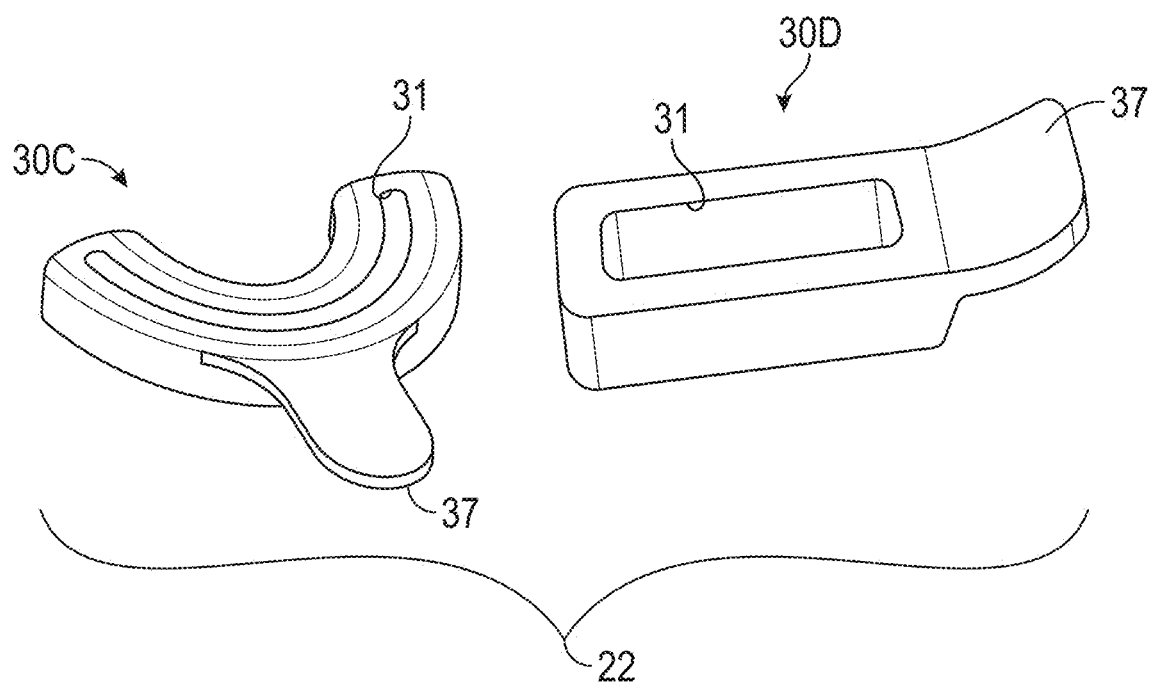
FIG. 5 is a perspective view of another embodiment of a set of imaging trays.

FIG. 5 is a perspective view of another set 22 of imaging trays. Tray 30C is an anterior quadrant tray configured to surround at least a portion of the anterior teeth (e.g., the incisors and the canines) for imaging. Tray 30C may be inverted to image either the upper or lower anterior teeth. Tray 30D is a posterior quadrant tray configured to surround at least a portion of the posterior teeth (e.g., the premolars and the molars) for imaging. Tray 30D may be inverted to image any of the upper or lower, left or right, posterior teeth. Trays 30C and 30D each have an aperture 31 configured for insertion of an endodontic file. Trays 30C and 30D may include a handle 37 as shown. In addition, or instead, trays 30C and 30D may connect to a proximal portion 42 as discussed above.

Several example embodiments of system 20 are provided below.

Example 1: Single Set of Imaging Trays

In this example embodiment, dental imaging system 20 includes a single set of imaging trays 22 configured to perform three imaging functions: digital x-ray, 3D dental scanning, and intraoral imaging. A plurality of sensors 38 are present in each of the imaging trays 30. Sensors 38 are provided to sense all bands of the electromagnetic spectrum required for these three imaging functions (for example, a first sensor or group of sensors may be configured to sense visible light and a second sensor or group of sensors may be configured to sense x-ray radiation). A plurality of light sources 39 are provided in each of the imaging trays, and are used to illuminate the teeth for 3D dental scanning and intraoral imaging. A workstation 50 includes an x-ray radiation source. An umbilical 40 connects each imaging tray to the workstation, for transfer of power, data, and/or light. Imaging trays of the set are interchangeably connected to umbilical 40.

Example 2: A Set of Imaging Trays for Each Imaging Function

In this example embodiment, dental imaging system 20 includes multiple sets of imaging trays 22, including: a first set of imaging trays configured to perform digital x-rays, a second set of imaging trays configured to perform 3D dental scanning, and a third set of imaging trays configured to perform intraoral imaging. The first set of imaging trays includes sensors and materials suitable for x-ray radiation, and may not include a light source. The first set of imaging trays may interface with a first proximal portion of the umbilical, which may for example provide power to the sensors and enable data transfer between the sensors and the workstation. The workstation may include or cooperate with an x-ray radiation source.

The second set of imaging trays includes sensors and light sources suitable for 3D dental scanning. The second set of imaging trays may interface with a second proximal portion of the umbilical, which may for example provide power to the sensors, light to the light sources of the trays, and enable data transfer between the sensors and the workstation. The workstation may include or cooperate with an illumination source (e.g., a laser or a lamp).

The third set of imaging trays includes sensors and light sources suitable for intraoral imaging. The third set of imaging trays may interface with a third proximal portion of the umbilical, which may for example provide power to the sensors, light to the light sources of the trays, and enable data transfer between the sensors and the workstation. In one embodiment, the second and third proximal portions are the same. The workstation may include or cooperate with an illumination source (e.g., a laser or a lamp).

Imaging trays of each set are interchangeably connected to umbilical 40.

In another embodiment, the second set of imaging trays may be further configured for intraoral imaging, so that only the first and second sets of imaging trays are required to perform the three imaging functions.

In terms of use, a method for imaging teeth in a mouth of a patient includes (refer to FIGS. 1-5):
(a) inserting a first imaging tray 30 into the mouth of the patient and positioning the first imaging tray to substantially surround one or more teeth of the patient, the first imaging tray including:
  (i) an exterior sidewall 32 and an interior sidewall 34 connected to the exterior sidewall by a floor 35;
  (ii) one or more imaging sensors 38 mounted on at least one of the exterior sidewall and the interior sidewall, each of the one or more imaging sensors configured to sense at least one of x-ray radiation, visible light, ultraviolet light, and infrared light; and
  (iii) a proximal end 45 structurally configured to interface with an umbilical 40 to receive at least one of power, data, and light;
(b) connecting the proximal end to the umbilical, the umbilical including one or more cables 48;
(c) connecting the umbilical to a workstation 50;
(d) transmitting, from the workstation to the first imaging tray via the one or more cables, at least one of power, data, and light;
(e) imaging the teeth of the patient, via the one or more imaging sensors;
(f) transmitting image data to the workstation from the first imaging tray via the one or more cables; and
(g) processing the image data, via the workstation, to generate one or more of a digital x-ray image, a 3D dental scan, and an intraoral image.

The method further including: inserting a second imaging tray into the mouth of the patient and positioning the second imaging tray to substantially surround one or more teeth of the patient, the first imaging tray and the second imaging tray forming a set of imaging trays collectively configured to image all of the teeth of the patient.

The embodiments of the dental imaging devices, systems, and methods of use described herein are exemplary and numerous modifications, combinations, variations, and rearrangements can be readily envisioned to achieve an equivalent result. Further, nothing in the above-provided discussions of the devices, systems, and methods should be construed as limiting the invention to a particular embodiment or combination of embodiments.

I claim:
1. A dental imaging system for use in imaging teeth in a mouth of a patient, the dental imaging system cooperating with an endodontic file, the dental imaging system comprising:
   one or more imaging trays shaped and configured for insertion into the mouth of the patient and positionable to substantially surround one or more teeth, each of the one or more imaging trays having an exterior sidewall and an interior sidewall connected to the exterior sidewall by a floor, each of the one or more imaging trays including one or more apertures in the floor, and each of the one or more apertures sized and located to permit insertion of the endodontic file therethrough;
   one or more imaging sensors mounted on at least one of the exterior sidewall and the interior sidewall, each of the one or more imaging sensors configured to sense at least one of x-ray radiation, visible light, ultraviolet light, and infrared light;
   each of the one or more imaging trays structurally configured to interface with an umbilical;
   one or more cables within the umbilical, each of the one or more cables configured to transmit at least one of power, data, and light;
   a workstation configured for communication with the one or more imaging trays via the umbilical; and
   wherein the dental imaging system is configured to perform one or more of digital x-ray imaging, 3D dental scanning, and intraoral imaging.

2. The dental imaging system of claim 1, further including:
   each of the one or more imaging trays including a first sensor configured to sense visible light and a second sensor configured to sense x-ray radiation.

3. The dental imaging system of claim 1, wherein each of the one or more imaging trays includes a light source.

4. The dental imaging system of claim 1, wherein each of the one or more imaging sensors is flexible.

5. The dental imaging system of claim 1, wherein each of the one or more imaging sensors is optically coupled to one or more of a lens and an optical filter.

6. The dental imaging system of claim 1, further including one or more sets of imaging trays, wherein each set of imaging trays is collectively configured to image all of the teeth of the patient.

7. The dental imaging system of claim 6, further including:
   a first set of imaging trays, each tray of the first set of imaging trays including one or more imaging sensors configured to sense x-ray radiation;
   a second set of imaging trays, each tray of the second set of imaging trays including one or more imaging sensors configured to sense visible light; and
   a third set of imaging trays, each tray of the third set of imaging trays including a light source.

8. The dental imaging system of claim 1, wherein the one or more cables within the umbilical include a power transmission cable, a data transmission cable, and a fiber-optic cable.

9. The dental imaging system of claim 1, wherein the workstation includes an x-ray radiation source.

10. A dental imaging tray for use in imaging teeth in a mouth of a patient, the dental imaging tray cooperating with an umbilical connected to a workstation and further cooperating with an endodontic file, the dental imaging tray comprising:
   an exterior sidewall and an interior sidewall connected to the exterior sidewall by a floor;

one or more apertures in the floor, each of the one or more apertures sized and located to permit insertion of the endodontic file therethrough;

one or more imaging sensors mounted on at least one of the exterior sidewall and the interior sidewall, each of the one or more imaging sensors configured to sense at least one of x-ray radiation, visible light, ultraviolet light, and infrared light;

a proximal end structurally configured to interface with an umbilical to receive at least one of power, data, and light; and wherein the dental imaging tray is shaped and configured for insertion into the mouth of the patient and positionable to substantially surround one or more teeth.

11. The dental imaging tray of claim 10, the teeth having a root below a gum line, wherein one or more of the exterior sidewall and the interior sidewall are shaped to extend beyond the gum line for imaging the root when the dental imaging tray is positioned in the mouth of the patient.

12. The dental imaging tray of claim 10, wherein the interior sidewall has an adjoining roof.

13. A method of imaging teeth in a mouth of a patient, the method including:
(a) inserting a first imaging tray into the mouth of the patient and positioning the first imaging tray to substantially surround one or more teeth of the patient, the first imaging tray including:
  (i) an exterior sidewall and an interior sidewall connected to the exterior sidewall by a floor;
  (ii) one or more apertures in the floor, each of the one or more apertures sized and located to permit insertion of an endodontic file therethrough;
  (iii) one or more imaging sensors mounted on at least one of the exterior sidewall and the interior sidewall, each of the one or more imaging sensors configured to sense at least one of x-ray radiation, visible light, ultraviolet light, and infrared light; and
  (iv) a proximal end structurally configured to interface with an umbilical to receive at least one of power, data, and light;
(b) connecting the proximal end to the umbilical, the umbilical including one or more cables;
(c) connecting the umbilical to a workstation;
(d) transmitting, from the workstation to the first imaging tray via the one or more cables, at least one of power, data, and light;
(e) imaging the teeth of the patient, via the one or more imaging sensors;
(f) transmitting image data to the workstation from the first imaging tray via the one or more cables;
(g) measuring a length of a tooth root by inserting the endodontic file through one or more of the apertures in the floor of the first imaging tray; and
(h) processing the image data, via the workstation, to generate one or more of a digital x-ray image, a 3D dental scan, and an intraoral image.

14. The method of claim 13 further including: inserting a second imaging tray into the mouth of the patient and positioning the second imaging tray to substantially surround one or more teeth of the patient, the first imaging tray and the second imaging tray forming a set of imaging trays collectively configured to image all of the teeth of the patient.

* * * * *